United States Patent
Golla et al.

(10) Patent No.: US 7,095,897 B2
(45) Date of Patent: Aug. 22, 2006

(54) ZERO LENGTH OR RUN LENGTH CODING DECISION

(75) Inventors: Kumar S. Golla, Plano, TX (US); David K. Vavro, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/742,155

(22) Filed: Dec. 19, 2003

(65) Prior Publication Data

US 2005/0135683 A1 Jun. 23, 2005

(51) Int. Cl.
*G06K 9/36* (2006.01)
(52) U.S. Cl. .................... 382/239; 382/245; 382/240
(58) Field of Classification Search ........ 382/240–232, 382/237, 238, 239–244, 245, 246, 247, 251, 382/235, 248; 348/395.1, 398.1, 405.1; 375/240.11, 375/240.18, 240.21, 240.24, 240.19; 358/426.14
See application file for complete search history.

(56) References Cited

U.S. PATENT DOCUMENTS 6,658,159 B1 * 12/2003 Taubman .................... 382/240
6,778,709 B1 * 8/2004 Taubman .................... 382/240

* cited by examiner

*Primary Examiner*—Wenpeng Chen
(74) *Attorney, Agent, or Firm*—Sharon Wong

(57) ABSTRACT

When encoding and decoding bit planes, a decision is made in the clean up pass if zero coding or run length coding should be performed. Embodiments of the invention provide a zero coding or run length coding decision instruction. The instruction will determine whether significance state variables associated with selected coefficients bits and their immediate neighbors are zero. If all the significance states are determined to be zero, then run length coding is performed. Else, zero coding is performed.

18 Claims, 6 Drawing Sheets

ZERO LENGTH OR RUN LENGTH CODING DECISION

RELATED APPLICATIONS

This application is related to U.S. application Ser. No. 10/741,038, filed on Dec. 19, 2003, entitled "Bit-Plane Formatting Including Zero Bit-Plane Detection"; U.S. application Ser. No. 10/742,381, filed on Dec. 19, 2003, entitled "Magnitude Refinement Coding"; U.S. application Ser. No. 10/741,572, filed on Dec. 19, 2003, entitled "Run Length Coding and Decoding"; U.S. application Ser. No. 10/741,027, filed on Dec. 19, 2003, entitled "Sign Coding and Decoding"; U.S. application Ser. No. 10/742,118, filed on Dec. 19, 2003, entitled "Zero Coding"; and U.S. application Ser. No. 10/742,155, filed on Dec. 19, 2003, entitled "Zero Coding or Run Length Coding Decision."

BACKGROUND

The JPEG 2000 standard utilizes transforms and provides a coding scheme and code stream definition for images. (See JPEG2000 standard, Information Technology—JPEG 2000 Image Coding System: Core Coding System, ISO/IEC FDIS 15444-1: 2000 JPEG Image Coding System, incorporated herein by reference.) Under the JPEG 2000 Standard, each image may be divided into rectangular tiles. If there is more than one tile, the tiling of the image creates tile-components. After tiling of an image, the tile-components are decomposed into one or more different decomposition levels using a wavelet transformation. These decomposition levels contain a number of sub-bands populated with coefficients that describe the horizontal and vertical spatial frequency characteristics of the original tile-components. The coefficients provide frequency information about a local area, rather than across the entire image. In particular, a small number of coefficients completely describe a single sample.

In JPEG2000, the arithmetic coding and decoding is performed bit-plane by bit-plane, from the most significant bit plane to the least significant bit plane. This reveals a weak point in processors, as they are not efficient when operating in the bit plane level in 2D.

DETAILED DESCRIPTION

Figure 1:
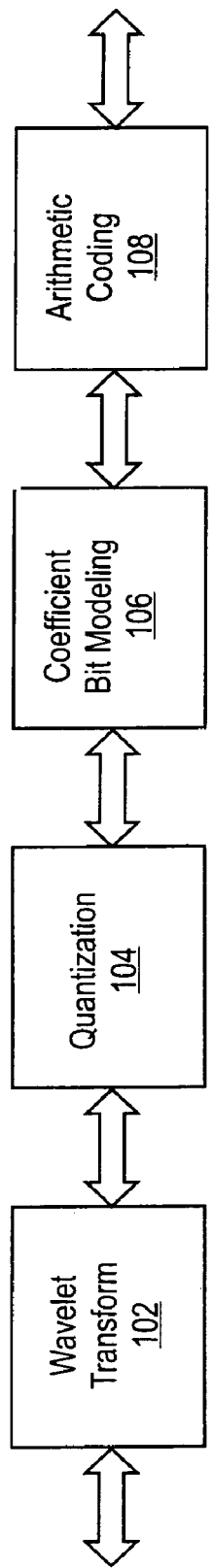
FIG. 1 illustrates a block diagram of one embodiment of a coder embodying the invention.

The principles of the arrangement described herein have general applicability to coding symbols representative of transform coefficients of one or more blocks of a digital image. For ease of explanation, the preferred embodiment is described with reference to JPEG2000. However, it is not intended that the present invention be limited to the described arrangement. For example, the invention may have application to bit-plane coding techniques in general and other coding techniques.

In JPEG2000, discrete wavelet transform coefficient bits are arranged into code-blocks and coded in bit plane order using three coding passes for each bit plane. A code-block is defined as a rectangular block within a sub-band. The coefficients inside the code-block are coded a bit plane at a time, starting with the most significant bit plane having a non-zero element and ending with the least significant bit plane.

For each bit plane in a code-block, a particular code-block scan pattern is used for each significance propagation, magnitude refinement and clean up pass. Each coefficient bit is coded only once in one of the three passes. The pass in which a coefficient bit is coded depends on the conditions for that pass. When encoding and decoding bit planes, a decision is made in the clean up pass if zero coding or run length coding should be performed. Embodiments of the invention provide a zero coding or run length coding decision instruction. This decision is based on significance state variable Sigma being zero. In particular, the instruction will determine whether significance state variables associated with four coefficients bits and their immediate neighbors are zero. If they are zero, then run length coding is performed. Else, zero coding is performed.

In the detailed description, numerous specific details are set forth in order to provide a thorough understanding of the present invention. However, it will be understood by those skilled in the art that the present invention may be practiced without these specific details. In other instances, well-known methods, procedures, components and circuits have been described in detail so as not to obscure the present invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Embodiments of the present invention may be implemented in hardware or software (microcode), or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a micro-controller, an application specific integrated circuit (ASIC), or a microprocessor.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Before proceeding with a description of the preferred arrangement, a brief review of the JPEG2000 coding method is given. Referring to FIG. 1, a block diagram of one embodiment 100 of a coder embodying the invention is illustrated. As mentioned previously, JPEG2000 divides a whole image into one or more image tile components, each of which are then 2-D discrete wavelet transformed. The transform coefficients of each image tile component are then grouped into sub-bands, which sub-bands are further partitioned into rectangular code blocks before each code block is then entropy encoded.

In particular, embodiment 100 of coder includes a discrete wavelet transform (DWT) 102, quantizer 104, coefficient bit modeler 106 and entropy coder 108 suitable for compressing images in accordance with JPEG2000. The original image is first divided into tiles. These tiles are rectangular arrays that include the same relative portion of all the components that make up the image. Thus, tiling of the image actually creates tile-components that can be decoded independently of each other. These tile-components can also be extracted and reconstructed independently. This tile independence provides one of the methods for extracting a region of the image.

Figure 2:
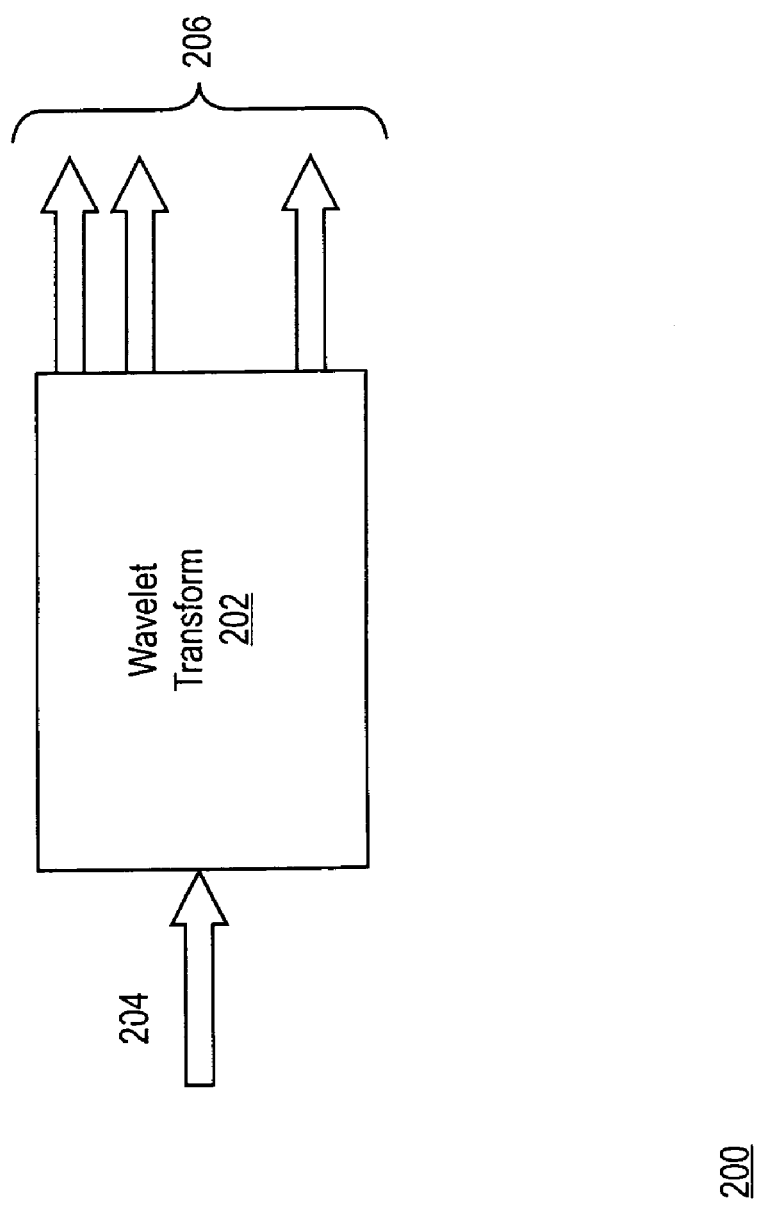
FIG. 2 illustrates a block diagram of one embodiment of a DWT decomposing an original image into subbands.

FIG. 2 illustrates a block diagram of one embodiment 200 of a DWT 202 decomposing an original image 204 into subbands 206. The tile components are decomposed into different decomposition levels using a wavelet transform. These decomposition levels contain a number of sub-bands populated with coefficients that describe the horizontal and vertical spatial frequency characteristics of the original tile-component planes. The coefficients provide frequency information about a local area, rather than across the entire image. That is, a small number of coefficients completely describe a single sample. A decomposition level is related to the next decomposition level by spatial powers of two. That is, each successive decomposition level of the sub-bands has approximately half the horizontal and half the vertical resolution of the previous. Images of lower resolution than the original are generated by decoding a selected subset of these sub-bands.

For example, a first DWT stage decomposes the original image ($LL_0$) into four sub-bands, denoted by the labels $LL_1$, $HL_1$, $LH_1$, and $HH_1$. The labels indicate the filtering and decomposition level ($LL_1$=low-pass filtering horizontally, low-pass filtering vertically, at the 1st level of decomposition). These sub-bands are populated with wavelet coefficients that describe spatial frequency characteristics of the original image. The second stage further breaks down $LL_1$ into the four sub-bands $LL_2$, $HL_2$, $LH_2$, and $HH_2$. Although only three such stages are shown in FIG. 2, this process may continue for many stages. Each LLn sub-band is a reasonable low resolution rendition of $LL_{n-1}$ with half the width and height.

Although there are as many coefficients as there are samples, the information content tends to be concentrated in just a few coefficients. Through quantization 104, the information content of a large number of small magnitude coefficients is further reduced. Additional processing by the entropy encoder reduces the number of bits required to represent these quantized coefficients, sometimes significantly compared to the original image.

The individual sub-bands of a tile-component are further divided into code-blocks. These rectangular arrays of coefficients can be extracted independently. In particular, each sub-band, comprised of coefficients produced in the DWT, is subjected to uniform scalar quantization in the quantization step. The quantized coefficient of the sub-bands are further broken down into two-dimensional arrays (for example, 64×64 or 32×32 samples) called code-blocks.

The coefficients are associated with different sub-bands arising from the transform applied. These coefficients are then arranged into rectangular blocks with each sub-band, called code-blocks. These code-blocks are then coded a bit-plane at a time starting from the most significant bit-plane with a non-zero element to the least significant bit-plane.

For each bit-plane in a code-block, a special code-block scan pattern is used for each of the coding passes. Each coefficient bit in the bit-plane is coded in only one the three coding passes. The coding passes are called significance propagation, magnitude refinement, and cleanup. For each pass, contexts are created which are provided to the arithmetic coder, CX, along with the bit stream, CD. The arithmetic coding step uses the context vectors and the corresponding coefficients to create a compressed data stream. The arithmetic coder is reset according to selected rules.

Figure 3:
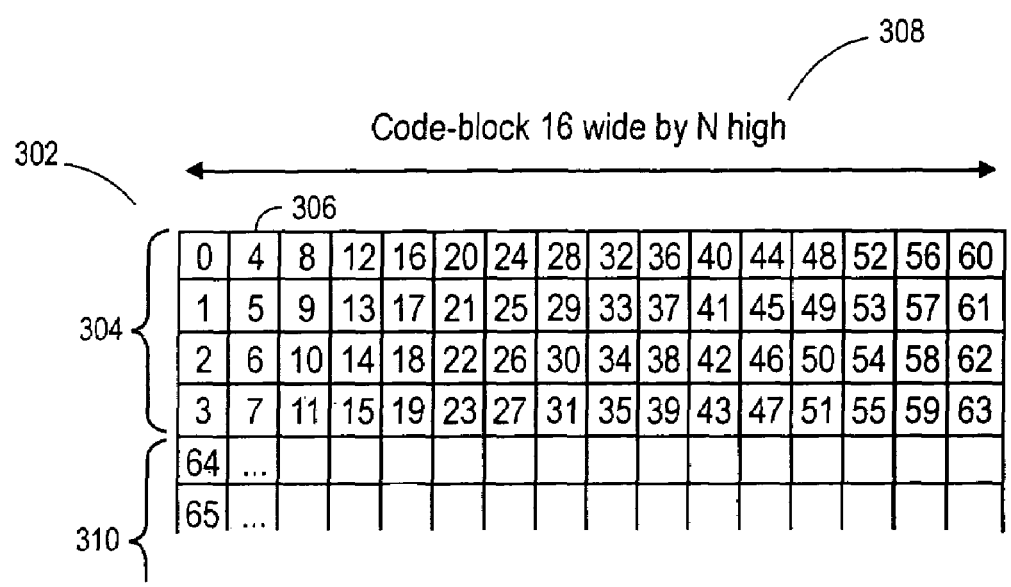
FIG. 3 illustrates a diagram of an exemplary embodiment of a code-block scan pattern of a code-block.

As stated above, the code-blocks of quantized coefficients are coded with three coding passes. These coding passes are performed on "bit planes," each of which is an array consisting of bits taken from the same position in each coefficient. The first bit plane is comprised of the most significant bits (MSB) of all the coefficient magnitudes in the code-block. The second bit-plane is comprised of the second MSBs of all the coefficient magnitudes in the code-block, and so on. Referring to FIG. 3, each quantized coefficient has four bits, for example, $a_1$, $a_2$, $a_3$, $a_4$. The MSB of each coefficient has a subscript of "1," for example, $a_1$. The first bit plane is comprised of $a_1$, $b_1$, $c_1$, $d_1$, the second bit-plane is comprised of $a_2$, $b_2$, $c_2$, $d_2$ and so forth until the least significant bits (LSB).

FIG. 3 is a diagram of an exemplary embodiment 300 of a code-block scan pattern of a code-block. Each bit-plane is scanned in a particular order. Starting at the top left 302, the first four bits of the first column 304 are scanned. Then the first four bits of the second column 306, until the width 308 of the code-block has been covered. Then the second four bits 310 of the first column are scanned and so on. A similar vertical scan is continued for any leftover rows on the lowest code-blocks in the sub-band.

This scan pattern is followed in each of the three coding passes. The decision as to in which pass a given bit is coded is made based on the "significance" of that bit's location and the significance of neighboring locations. A location is considered significant if a 1 has been coded for that location (quantized coefficient) in the current or previous bit planes.

The first pass is called the significance propagation pass. A bit is coded in this pass if its location is not significant, but at least one of its eight-connected neighbors is significant. If a bit is coded in this pass, and the value of that bit is "1," its location is marked as significant for the purpose of coding subsequent bits in the current and subsequent bit planes. Also, the sign bit is coded immediately after the "1" bit just coded.

The second pass is the magnitude refinement pass (MRP), where all bits from the locations that became significant in a previous bit plane are coded.

The third and final pass is the clean-up pass, where bits not coded in the first two passes are taken care of. The results of these three scanning passes are the context vectors for the quantized coefficients.

Embodiments of the invention provide a zero coding or run length coding decision instruction. This decision is based on significance state variable Sigma being zero. In particular, the instruction will determine whether significance state variable Sigmas associated with four selected coefficients bits and their immediate neighbors are zero. If they are zero, then run length coding is performed. Else, zero coding is performed. When performing run length coding, the pixel bits are used after wavelet transformation to determine the output context (CX) and decision (D) as shown. When performing zero coding, the significance state variable sigmas are used to determine the output context (CX).

Figure 4:
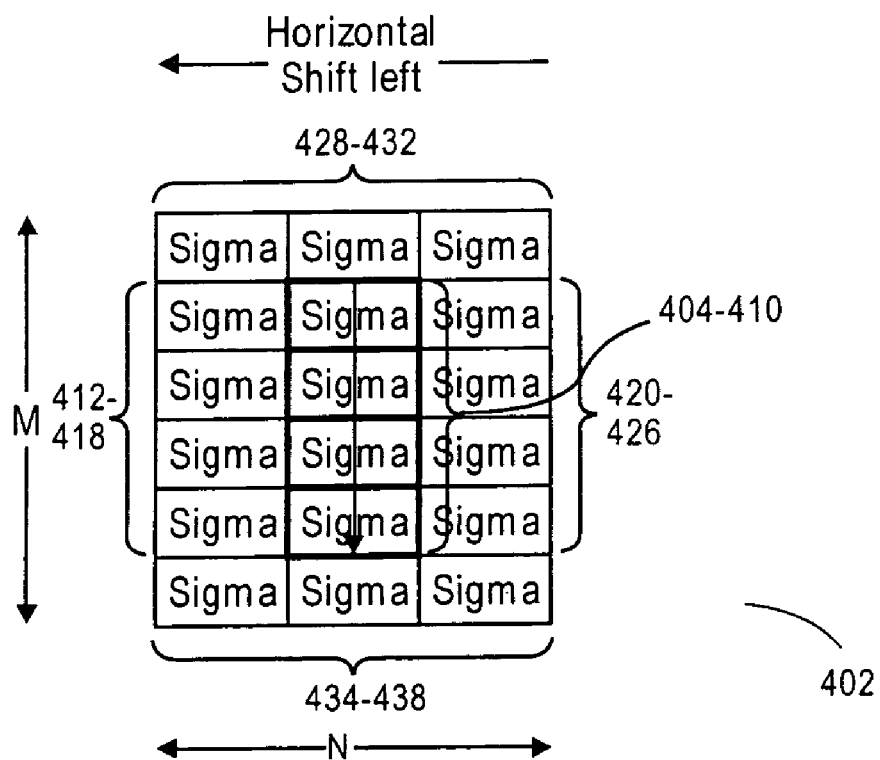
FIG. 4 illustrates a block diagram of one embodiment of a register storing values for state variables sigma to be used to determine whether zero coding or run length coding should be implemented during the clean up pass.

FIG. 4 is a block diagram of an embodiment 400 of register 402 for state variable sigma. In particular, the state variable is shown aligned in a processor's register set. The array of state variable sigmas corresponds to an array of quantized coefficients being scanned. Each bit-plane of a code block is scanned in a particular order. Starting at the top left, the first four bit symbols of the column are scanned. Then the first four bit symbols of the second column, until the width of the code-block has been covered. Then the second four bit symbols of the first column are scanned and so on. A similar scan is continued for any leftover rows on the lowest code blocks in the sub-band. Sigma bits are typically stored in local processors registers in the same scan order as shown in FIG. 4. These can be shifted to the left to perform the same compare on the next scan.

Embodiments of the instruction will determine whether zero coding or run length coding should be implemented based upon the significance state variable sigmas of selected coefficient bits 404–410 and immediate horizontal and vertical neighboring bits 412–438. If they are zero, then run length coding is performed else zero coding is performed. The instruction is expanded to include N×M zero checks but in example the zero check is 3×6. This check is preferably performed on every 4 pixels and in every bit plane.

The zero coding or run length coding decision according to the presently preferred embodiment of the invention may be implemented in response to an instruction set including decision instruction. When implementing this instruction, the host processor controls (either directly or indirectly) the zero coding or run length coding decision. In general, the exact operation sequence to be performed is based on the contents of the block master data structure, which contains the information of the current coefficient block which is being processed. The block master data structure can be implemented in either software or hardware, depending on the embodiment. In the presently preferred embodiments, the block master data structure is implemented as hardware, specifically, as a register set. The registers may include a sigma state variable registers which contains the quantized coefficient values of the stripe currently being scanned and significance values. This register can be connected directly with the memory storage containing the coefficient values, or updated under control of the host processor. During encoding, this register may be scanned to produce the information required to control the operation sequences in the codec.

In a typical implementation, if the scanning block is 64 pixels by 64 pixels and each pixel is 16 bits, then this check must be performed 64/4×64×15=15360 times. Embodiments of the invention reduce the number of instruction it would take to check 18 bits for all zeros. With current instructions, the processor typically reads row one and perform an AND to mask out all but 3 bits, then check for a zero flag. If zero flag, then read the next row, perform an AND, check the zero flag and so on. Thus, with two instructions per row times 6 rows=12 instructions. Embodiments of the invention provide an instruction that is 12 times faster saving 11×15360=168960 instructions for just a 64 by 64 pixel block.

Embodiments of the invention allow a signal processor or a general processor to perform a vital piece of JP2000 Bit Plane Coding and decoding at a much higher rate. If this instruction is included in the instruction set the processor has a greater advantage than without one when supporting JPEG2000.

Figure 5:
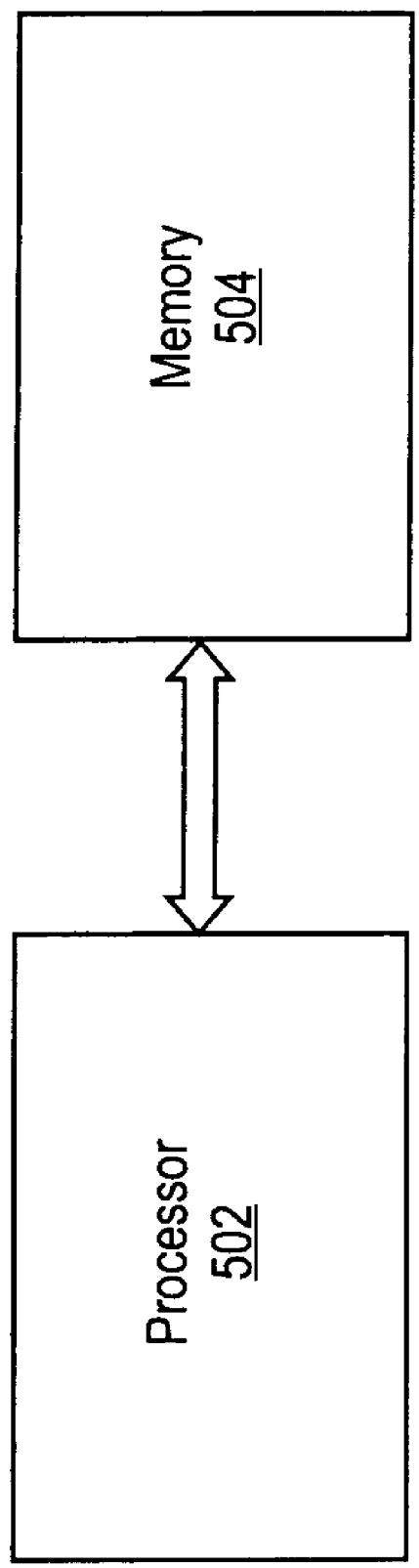
FIG. 5 is an embodiment of a system for implementing embodiments of the invention.

FIG. 5 is an embodiment of a system 500 for implementing embodiments of the invention. In particular, the system includes a processor 502 and memory 504. As noted above, for purposes of this application, a processing system includes any system that has a processor, such as, for example, a digital signal processor (DSP), a micro-controller, an application specific integrated circuit (ASIC), or a microprocessor. The system may be specially constructed for the required purposes, or it may comprise a general purpose computer selectively activated or reconfigured by a computer program stored in the computer. The processor 502 may be configured to format images compatible with the JPEG2000 format.

When encoding and decoding bit planes, a decision is made in the clean up pass if zero coding or run length coding should be performed. Processor 502 executes a zero coding or run length coding decision instruction. The instruction will determine whether significance state variables associated with selected coefficients bits and their immediate neighbors are zero. If all the significance states are determined to be zero, then run length coding is performed. Else, zero coding is performed.

Figure 6:
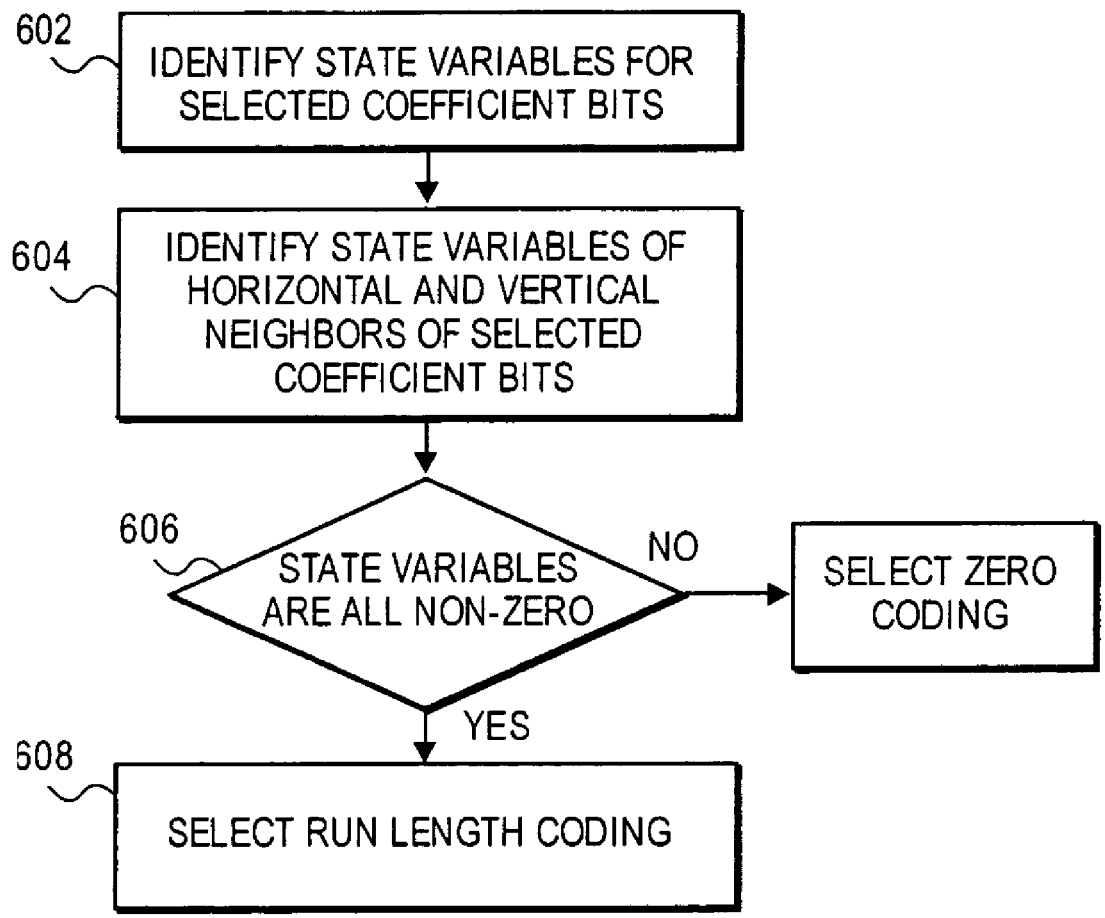
FIG. 6 is a flowchart of an embodiment for determining zero coding or run length coding.

FIG. 6 is a flowchart 600 of an embodiment for determining zero coding or run length coding.

In step 602, state variables associated with selected coefficient bits to be processed are identified. In a typical implementation, the state variables are significance state variables and correspond to an array of quantized coefficients being scanned.

In step 604, state variables associated with horizontal and vertical neighboring bits of the selected bits to be processed are identified.

In step 606, it is determined whether state variables associated with coefficients bits and neighboring bits are zero.

In response to state variables associated with coefficient bits and neighboring bits being all zero (step 606), run length coding is selected (step 608).

In response to at least one state variable associated with coefficient bits and neighboring bits being non-zero (step 606), zero coding is selected (step 610).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. Embodiments of the invention may be implemented in digital signal processors as well as standard processors because of the capabilities it provides for processing applications such as JPEG2000 as well as existing applications such as JPEG. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed:

1. A method for determining zero coding or run length coding, comprising:
   in response to a selected bit to be processed with a clean up pass, executing an instruction to
      identify state variables associated with selected coefficient bits to be processed;
      identify state variables associated with horizontal and vertical neighboring bits of the selected bits to be processed;
      determine whether state variables associated with coefficients bits and neighboring bits are zero, wherein a row is read, AND operation is performed to mask out selected bits and zero checked; and
      in response to state variables associated with coefficient bits and neighboring bits being all zero, select run length coding.

2. The method claimed in claim 1, wherein the state variables are significance state variables.

3. The method claimed in claim 1, further comprising:
   in response to at least one state variable associated with coefficient bits and neighboring bits being non-zero, select zero coding.

4. The method claimed in claim 1, wherein the state variables correspond to an array of quantized coefficients being scanned.

5. The method claimed in claim 1, further comprising:
   determine whether state variables associated with coefficients bits and neighboring bits are zero on every four pixels and in every bit plane.

6. The method claimed in claim 1, wherein the instruction is used for JPEG2000.

7. A system, comprising:
   a memory;
   a processor to execute an instruction to
      identify state variables associated with selected coefficient bits to be processed;
      identify state variables associated with horizontal and vertical neighboring bits of the selected bits to be processed;
      determine whether state variables associated with coefficients bits and neighboring bits are zero, wherein a row is read, AND operation is performed to mask out selected bits and zero checked; and
      in response to state variables associated with coefficient bits and neighboring bits being all zero, select run length coding.

8. The system claimed in claim 7, wherein the state variables are significance state variables.

9. The system claimed in claim 7, further comprising:
   in response to at least one state variable associated with coefficient bits and neighboring bits being non-zero, select zero coding.

10. The system claimed in claim 7, wherein the state variables correspond to an array of quantized coefficients being scanned.

11. The system claimed in claim 7, wherein the processor executes instruction compatible with JPEG2000.

12. The system claimed in claim 7, wherein the state variable is aligned in the processor's register set.

13. A machine readable medium having stored therein a plurality of machine readable instructions executable by a processor to determine zero coding or run length coding, comprising:
   instructions to identify state variables associated with selected coefficient bits to be processed;
   instructions to identify state variables associated with horizontal and vertical neighboring bits of the selected bits to be processed;
   instructions to determine whether state variables associated with coefficients bits and neighboring bits are zero, wherein a row is read, AND operation is performed to mask out selected bits and zero checked; and
   in response to state variables associated with coefficient bits and neighboring bits being all zero, instructions to select run length coding.

14. The machine readable medium claimed in claim 13, wherein the state variables are significance state variables.

15. The machine readable medium claimed in claim 13, further comprising:

in response to at least one state variable associated with coefficient bits and neighboring bits being non-zero, instructions to select zero coding.

16. The machine readable medium claimed in claim 13, wherein the state variables correspond to an array of quantized coefficients being scanned.

17. The machine readable medium claimed in claim 13, further comprising:

instructions to determine whether state variables associated with coefficients bits and neighboring bits are zero on every four pixels and in every bit plane.

18. The machine readable medium in claim 13, wherein the instruction is used for JPEG2000.

* * * * *